US006647815B2

(12) United States Patent
O'Donnell

(10) Patent No.: US 6,647,815 B2
(45) Date of Patent: Nov. 18, 2003

(54) SLIDE POSITIONER

(75) Inventor: Pat O'Donnell, Langley (CA)

(73) Assignee: Voith Paper Patent GmbH, Heidenheim (DE)

( * ) Notice: Subject to any disclaimer, the term of this patent is extended or adjusted under 35 U.S.C. 154(b) by 84 days.

(21) Appl. No.: 09/836,943

(22) Filed: Apr. 17, 2001

(65) Prior Publication Data

US 2001/0030033 A1 Oct. 18, 2001

(30) Foreign Application Priority Data

Apr. 18, 2000 (DE) .................................... 200 07 087 U

(51) Int. Cl.[7] .......................... F16C 29/02; F16H 25/20

(52) U.S. Cl. .......................... 74/99 R; 74/104; 384/276; 242/481

(58) Field of Search .................. 384/24, 276; 74/99 R, 74/102, 104, 105, 110, 479.01; 242/562, 481

(56) References Cited

U.S. PATENT DOCUMENTS

| | | | | | |
|---|---|---|---|---|---|
| 35,622 | A | * | 6/1862 | Platt | 384/276 |
| 3,699,827 | A | * | 10/1972 | Vogel | 474/14 |
| 3,808,900 | A | * | 5/1974 | Vadeboncoeur et al. | 474/13 |
| 4,386,574 | A | * | 6/1983 | Riolland | 114/103 |
| 4,641,462 | A | * | 2/1987 | Markus | 49/460 |
| 4,807,792 | A | * | 2/1989 | Tajima et al. | 226/74 |
| 4,997,232 | A | * | 3/1991 | Johnsen | 297/209 |
| 5,674,361 | A | | 10/1997 | Marinack | 162/111 |
| 5,853,667 | A | * | 12/1998 | Seaton et al. | 422/65 |
| 6,315,451 | B1 | * | 11/2001 | Michioka et al. | 384/42 |

FOREIGN PATENT DOCUMENTS

| | | | |
|---|---|---|---|
| DE | 2 327 081 | 12/1973 | F16H/35/08 |
| DE | 41 02 083 A1 | 10/1991 | G05D/3/10 |
| DE | 42 00 923 A1 | 8/1992 | F16H/19/06 |
| JP | 11-322148 | * 11/1999 | |

OTHER PUBLICATIONS

G.C. Westec Ltd., Thunder Bay, Ontario, Canada.

* cited by examiner

*Primary Examiner*—David A. Bucci
*Assistant Examiner*—Colby Hansen
(74) *Attorney, Agent, or Firm*—Taylor & Aust, P.C.

(57) ABSTRACT

A slide positioner for moving a structural member from an inoperating position to a working or operating position has a square shaft for supporting the structural member. Two bearing assemblies are adapted for supporting the sliding shaft. The two bearing assemblies are spaced one from the other and are connected to a stationary base. One of the bearing assemblies is rigidly connected to a pneumatic cylinder whose piston rod is connected to the sliding shaft. The bearing assemblies are mountable to the base in various angular positions since the bearing assemblies may be pivoted around an axis which is parallel to the axis of the sliding shaft.

7 Claims, 3 Drawing Sheets

SLIDE POSITIONER

BACKGROUND OF THE INVENTION

1. Field of the Invention

The present invention relates to a slide positioner adapted to move any structural member from an inoperating position to a working or operating position.

2. Description of the Related Art

A slide positioner known from a brochure of G. C. Westec Ltd., Thunder Bay, Ontario, Canada, includes the various elements and features. A sliding shaft supporting a structural member (e.g., a so-called threading pan) has a polygonal (namely a square) cross section. A bearing device is adapted for supporting the sliding shaft and may be connected to a stationary frame. The bearing device is also connected to a linear motor, typically a pneumatic cylinder whose piston rod is connected to the sliding shaft. During the normal operation of the paper machine, the slide positioner holds the threading pan in a position beside the machine. During startup or after a web break, the threading pan is moved into an operating position and held there during the threading operation.

Additionally, the structural member to be moved may be a peeling or lifting nozzle (or separating blow pipe) which is used in a paper-making machine in order to peel off an edge strip (or "tail") of the paper web produced, such as from a press roll or a drying cylinder. The structural member may also be a transfer device or a so-called mini-doctor which is used to transfer the edge strip to a following section of the paper machine. All those structural members are helpful to facilitate the threading of paper web into the machine when the machine is started up or after a web break.

SUMMARY OF THE INVENTION

Slide positioners of conventional design have proven successful in operation. However, a number of demands have prompted the need to improve the conventional design.

Those demands include the following objects:

A) Various mounting requirements, in particular on paper-making or paper-finishing machines, shall be met while maintaining the ability to accurately position the structural member in the machine in order to perform the desired task;

B) The manufacturing costs should be minimized by using interchangeable elements; and C) Slide elements which are subject to wear due to friction between the sliding shaft and the bearing assemblies should be easily replaceable.

In one embodiment of the present invention, the sliding shaft includes two spaced bearing assemblies which are mountable relative to a stationary base in various angular positions. In other words, each bearing assembly is supported in a bore hole or in a circular cutout of the stationary base. As a result, the structural member supported by the sliding shaft can easily be brought into a convenient position (e.g., relative to the paper machine). Thereafter, the bearing assemblies are fixed to the stationary base, e.g., with bolts. Therefore, the slide positioner of the present invention, meets several different mounting requirements, e.g., on a paper-making machine, allowing the structural member to be accurately positioned in the place where it will operate.

In a preferred embodiment of the invention, the rotational axis of the bearing assemblies coincides with the axis of the sliding shaft. In other words, when the structural member is adjusted into its required angular position, the bearing assemblies together with the sliding shaft and with the linear motor are pivoted around the axis of the sliding shaft. Since the cylinder, specifically the stationary element of the linear motor, is connected to only one of the two bearing assemblies, the installation of linear motors of various stroke lengths is possible, without having to make any other changes to the slide positioner assembly.

According to another embodiment of the invention, the rotational axis of the bearing assemblies coincides with the axis of the linear motor. This design allows the mounting of the linear motor (e.g., pneumatic cylinder) directly onto the stationary base, so that the need for flexible pressure lines is avoided.

According to another aspect of the invention, each of the bearing assemblies includes at each surface of the polygonal sliding shaft a separate replaceable slide strip. Preferably, the sliding shaft has the form of a square tubing; in this case, each bearing assembly is fitted with four identical, replaceable slide strips. These are preferably manufactured from a self-lubricating material, e.g., PTFE (polytetraflouroethylene). This material reduces the friction forces between the sliding shaft and the bearing assemblies. If, nevertheless, one of the slide strips becomes worn, this single slide strip may be easily replaced, without having to disassemble the complete slide positioner.

It should be noted that the aforementioned separately replaceable slide strips may be use not only in the above-described bearing assemblies which are mountable to the base in various angular positions. Rather than that, the separately replaceable slide strips may also be used in conventional slide positioners having at least one rigidly mounted bearing device for the sliding shaft.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Figure 1:
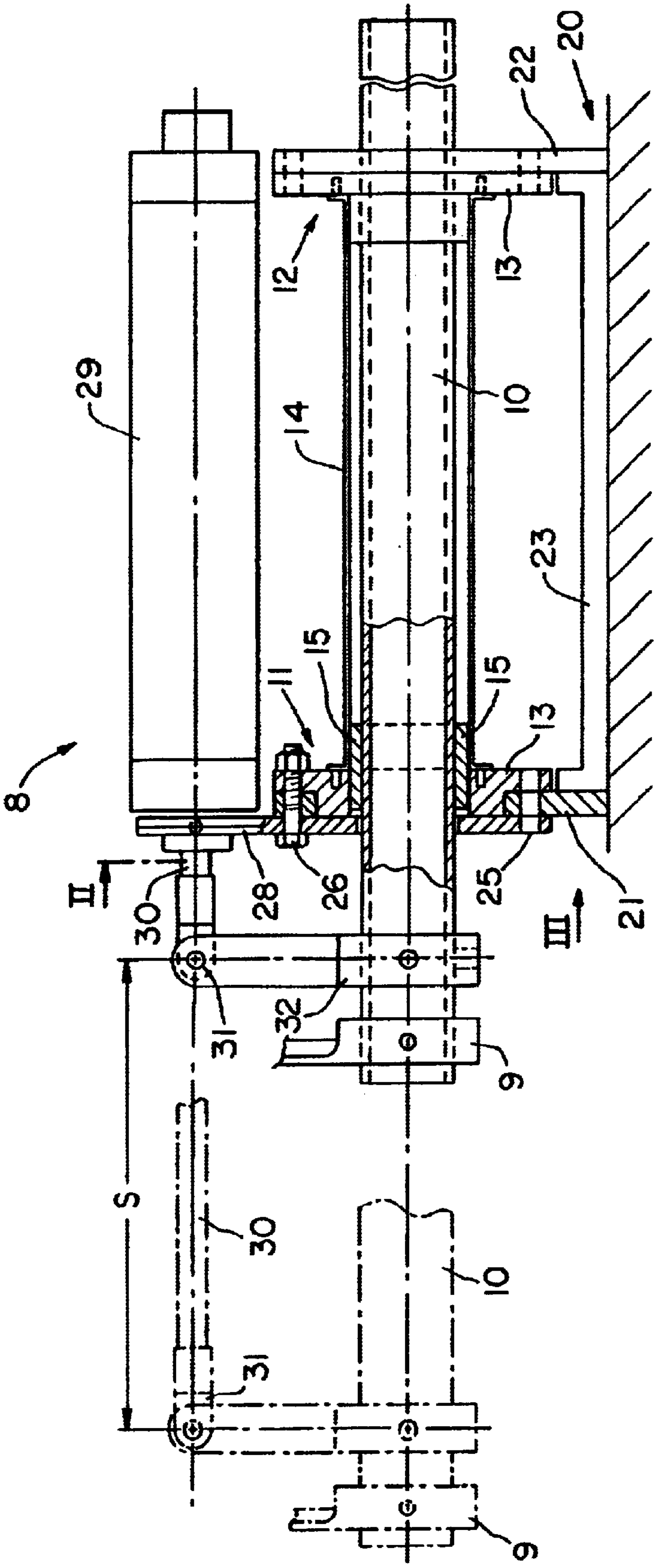
FIG. 1 is a partial cut-away view of one embodiment of the present invention.

Corresponding reference characters indicate corresponding parts throughout the several views. The exemplifications set out herein illustrate at least one preferred embodiment of the invention, in one form, and such exemplifications are not to be construed as limiting the scope of the invention in any manner.

DETAILED DESCRIPTION OF THE INVENTION

A slide positioner 8 shown in FIGS. 1–5 includes a sliding shaft 10 supporting a structural member 9 and having a square cross section. Sliding shaft 10 is supported by a first bearing assembly 11 and by a second bearing assembly 12 spaced from first bearing assembly 11. Bearing assemblies

11 and 12 are connected to a stationary base assembly 20. As an example, base assembly 20 includes two identical flanges 21 and 22 which are rigidly connected to a base plate 23. Each of flanges 21, 22 has a circular cutout 24 which is arranged coaxial to sliding shaft 10.

Figure 5:
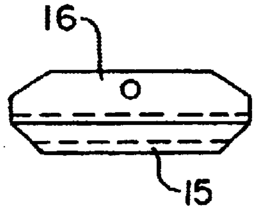
FIG. 5 is a view along section line V of FIG. 4.
Figure 4:
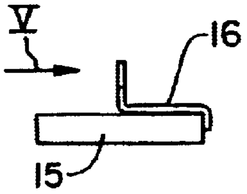
FIG. 4 is a side view of one of the slide strips with its holder.

Each of bearing assemblies 11, 12 has a hub 13, with hubs 13 being identical. Each hub 13 is a cylindrical collar which fits into cylindrical cutout 24 of one of stationary flanges 21, 22. Also, each hub 13 has a centrical square cutout which is somewhat larger than the cross section of sliding shaft 10. Therefore, at each of the four surfaces of sliding shaft 10, a separate slide strip 15 is mounted between sliding shaft 10 and hub 13. Each slide strip 15 is connected to hub 13 by a holder 16 (FIGS. 4 and 5). It may be now understood that slide positioner 8 includes eight identical slide strips 15 as well as eight identical holders 16. Between bearing assemblies 11, 12, a dust cover 14 is arranged. The same is divided into two parts so it may be easily removed to inspect and/or replace one or more of slide strips 15.

Figure 2:
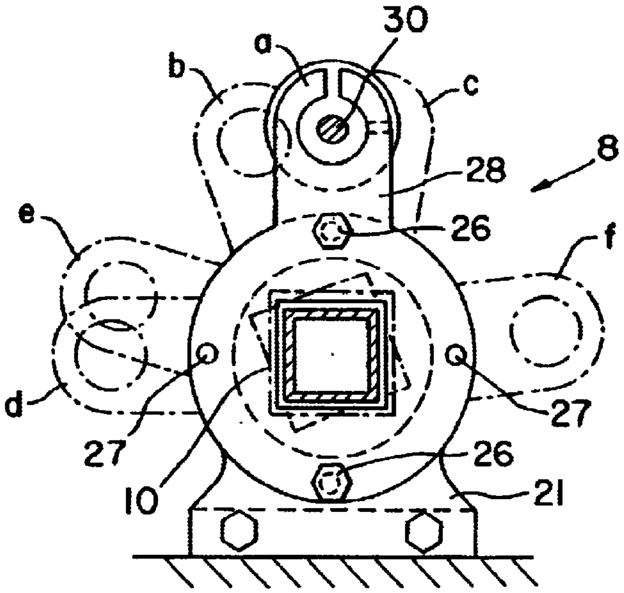
FIG. 2 is a cross sectional along section line 2 of FIG. 1.
Figure 3:
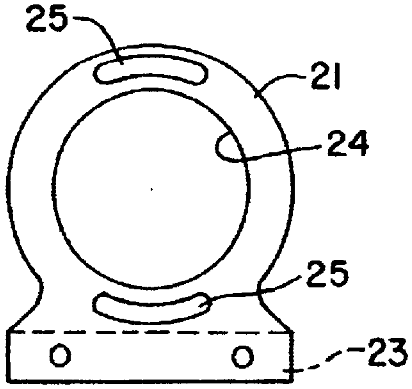
FIG. 3 is a view along section line 3 of FIG. 1 onto the stationary base assembly, only.

Each of stationary flanges 21 and 22 has, around circular cutout 24, two circular slots 25 which allow mounting of bearing assemblies 11 and 12 (i.e., first bearing assembly 11 together with a support for a linear motor 29) in a selectable angular position, as shown at a, b and c, respectively, in FIG. 2. Selected position a, b, c will be fixed by two bolts 26 in each bearing assembly 11, 12. If linear motor 29 should be mounted in a position e, d or f (at about 90° to vertical position a), support 28 may be mounted by using additional bolt holes 27.

Figure 6:
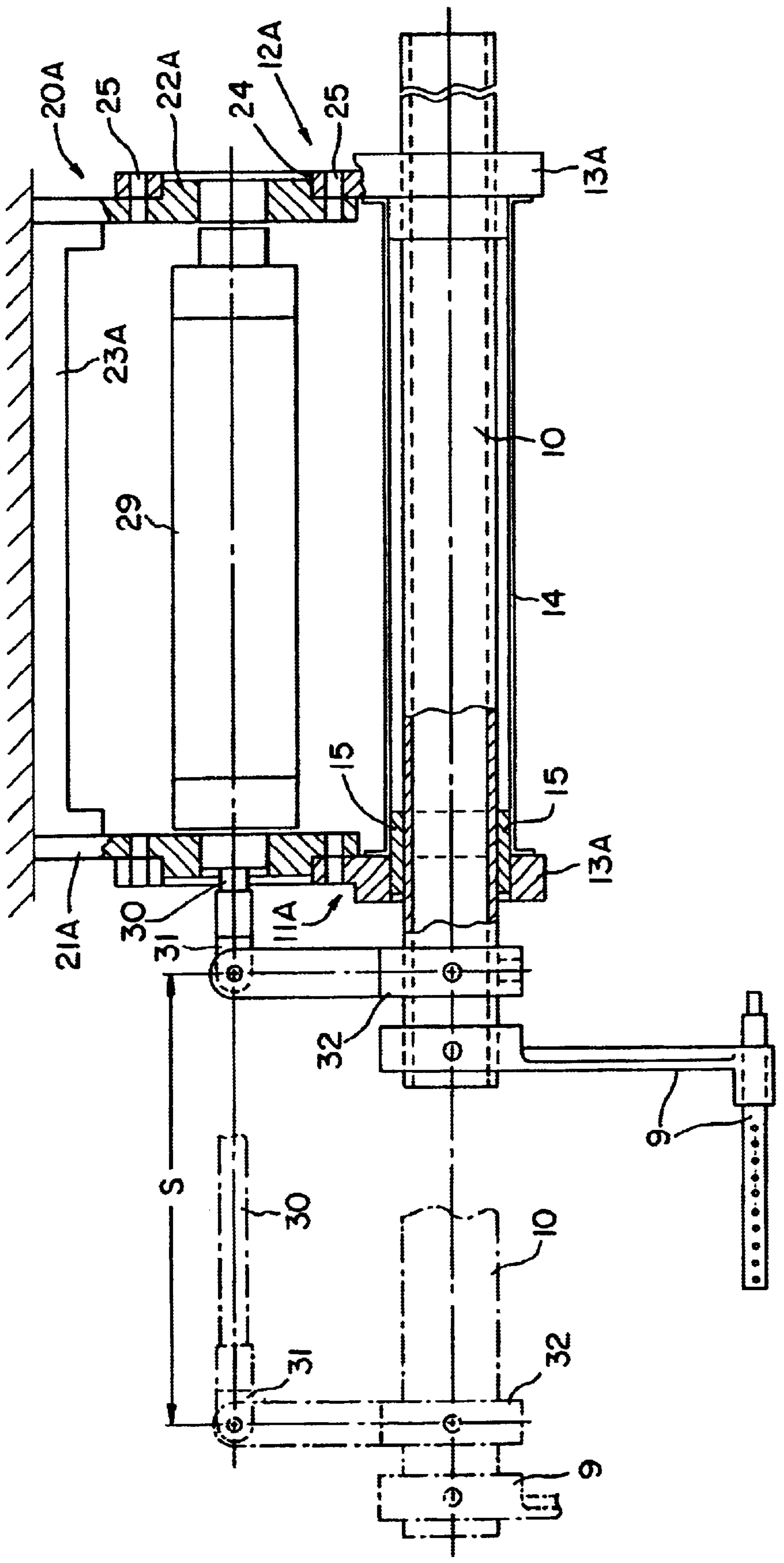
FIG. 6 is a partial cut-away view of another embodiment of a slide positioner of the present invention.

Linear motor 29 is formed as a pneumatic cylinder. Piston rod 30 thereof is connected by a clevis 31 to an arm of a sleeve 32 which is fastened to sliding shaft 10. FIG. 1 shows only a support of structural member 9. By a supply of pressure to cylinder 29, member 9 can be moved from an inoperating position (shown in full lines) to an operating position shown in dot-dash-lines, with the strike length being designated S. As shown in FIG. 6, structural member 9 may be, as an example, a peeling jet pipe.

In FIG. 6, sliding shaft 10, linear motor 29 with piston rod 30 connecting elements 31, 32, as well as replaceable slide strips 15 with holders 16, may be identical with the corresponding elements of FIGS. 1 to 5. Base assembly 20A includes a base plate 23A and two supports 21A and 22A, each having a circular collar being coaxial to linear motor 29. Linear motor 29 is connected to one support 21A. There are again two bearing assemblies 11A and 12A, each having a hub 13A which supports slide strips 15. Each hub 13A has a flange having a circular cutout 24 into which a collar of one of supports 21A, 22A is fits. Also, each hub 13A has two circular slots 25 (similar to slots 25 of FIG. 3) which allow the fastening of bearing assemblies 11A, 12A together with sliding shaft 10 in a selectable angular position around the axis of linear motor 29.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A slide positioner for moving a structural member from an inoperative position to at least one of an operative position and a working position within a papermaking machine, said slide positioner comprising:

a base;

a first bearing assembly connected to said base;

a second bearing assembly connected to said base and spaced from said first bearing assembly; and a sliding shaft supported by said first bearing assembly and said second bearing assembly, said sliding shaft being configured for supporting the structural member, said sliding shaft having a shaft axis and an at least approximately polygonal cross section, said first bearing assembly and said second bearing assembly conjunctively defining a bearing axis and being one of pivotable and rotatable about said bearing axis, said bearing axis being parallel to said shaft axis, said first bearing assembly and said second bearing assembly thereby being mountable in various angular positions relative to said base, said shaft axis having a direction, said sliding shaft slidable in said direction of said shaft axis when moving the structural member.

2. The slide positioner of claim 1, wherein said bearing axis coincides with said shaft axis.

3. The slide positioner of claim 2, further comprising a linear motor, said linear motor including a stationary element and a movable element, said stationary element being rigidly connected to said first bearing assembly, said movable element being connected to said sliding shaft.

4. The slide positioner of claim 1, further comprising a linear motor rigidly connected to said first bearing assembly, said linear motor having a motor axis, said motor axis coinciding with said bearing axis.

5. A slide positioner for moving a structural member from an inoperative position to at least one of an operative position and a working position, said slide positioner comprising:

a base;

a first bearing assembly connected to said base;

a second bearing assembly connected to said base and spaced from said first bearing assembly;

a sliding shaft supported by said first bearing assembly and said second bearing assembly, said sliding shaft being configured for supporting the structural member, said sliding shaft having a shaft axis and an at least approximately polygonal cross section, said first bearing assembly and said second bearing assembly conjunctively defining a bearing axis and being one of pivotable and rotatable about said bearing axis, said bearing axis being parallel to said shaft axis, said first bearing assembly and said second bearing assembly thereby being mountable in various angular positions relative to said base, said bearing axis coincides with said shaft axis; and a linear motor, said linear motor including a stationary element and a movable element, said stationary element being rigidly connected to said first bearing assembly, said movable element being connected to said sliding shaft, said movable element is a piston rod.

6. A slide positioner for moving a structural member from an inoperative position to at least one of an operative position and a working position, said slide positioner comprising:

a base;

a first bearing assembly connected to said base;

a second bearing assembly connected to said base and spaced from said first bearing assembly; and a sliding shaft supported by said first bearing assembly and said second bearing assembly, said sliding shaft being configured for supporting the structural member, said sliding shaft having a shaft axis and an at least approximately polygonal cross section, said first bearing assembly and said second bearing assembly conjunctively defining a bearing axis and being one of pivotable and rotatable about said bearing axis, said bearing axis being parallel to said shaft axis, said first bearing assembly and said second bearing assembly thereby being mountable in various angular positions relative to said base, said sliding shaft has a plurality of sliding surfaces, each of said first bearing assembly and said second bearing assembly having a separately replaceable slide strip associated with and positioned relative to each sliding surface.

7. The slid positioner of claim 6, wherein each separately replaceable slide strip is composed of a self-lubricating material.

* * * * *